United States Patent [19]

Fang

[11] Patent Number: 5,011,104

[45] Date of Patent: Apr. 30, 1991

[54] ADJUSTABLE FRAME

[75] Inventor: Roger C. Fang, Alhambra, Calif.

[73] Assignee: Tatung Company of America, Inc., Long Beach, Calif.

[21] Appl. No.: 519,915

[22] Filed: May 7, 1990

[51] Int. Cl.$^5$ .............................................. A47G 29/00
[52] U.S. Cl. .................................... 248/125; 248/412; 248/161; 248/188.5; 403/104
[58] Field of Search ............... 248/125, 412, 411, 157, 248/188.2, 161, 188.5; 403/109, 374, 104, 110

[56] References Cited

U.S. PATENT DOCUMENTS

| | | | |
|---|---|---|---|
| 689,855 | 12/1901 | Copeland | 248/412 X |
| 1,682,342 | 8/1928 | Kraft | 248/412 X |
| 1,970,624 | 8/1934 | Recker | 248/412 |
| 2,184,358 | 12/1939 | Moore | 403/109 X |
| 2,641,430 | 6/1953 | Secofsky et al. | 248/412 |
| 2,902,592 | 9/1959 | Cole et al. | 248/411 X |
| 2,947,556 | 8/1960 | Wenger | 403/104 X |
| 3,908,945 | 9/1975 | Shapiro et al. | 248/412 X |
| 4,277,197 | 7/1981 | Bingham | 403/104 |

FOREIGN PATENT DOCUMENTS 603581  6/1948  United Kingdom ................ 248/161

Primary Examiner—Karen J. Chotkowski
Attorney, Agent, or Firm—Gene W. Arant

[57] ABSTRACT

An adjustable frame includes an outer tubular member and an inner cylindrical member disposed in longitudinally adjustable relation, the inner member being of substantially smaller diameter than the interior surface of the outer member so as to provide an annular space between the two members. Inner and outer adapter rings are disposed about the inner cylindrical member within the annular space. The adapter rings have longitudinally tapered mating surfaces for providing a cam action. A sleeve is threadedly supported from the outer tubular member and engages one of the adapter rings for moving it axially relative to the other ring to thereby create a radial expansion force within the annular space, thus locking the inner cylindrical member in a fixed longitudinal position relative to the outer tubular member.

4 Claims, 1 Drawing Sheet

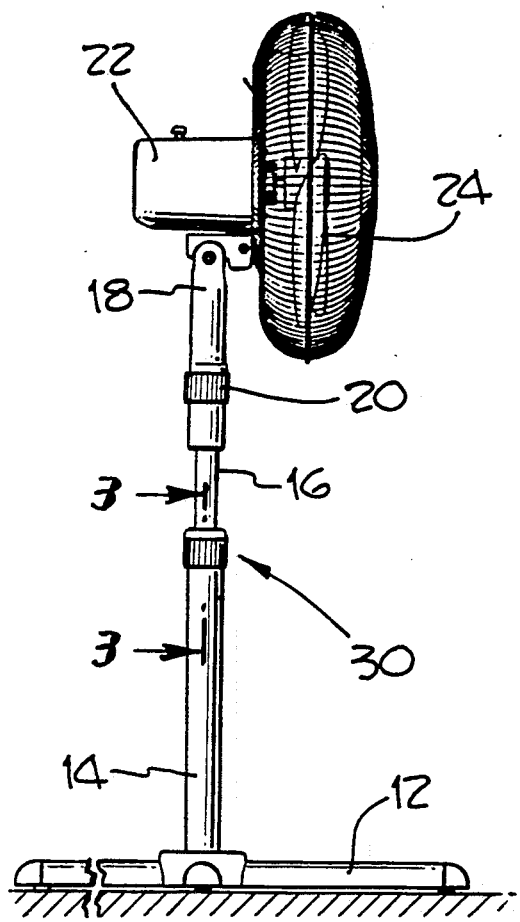
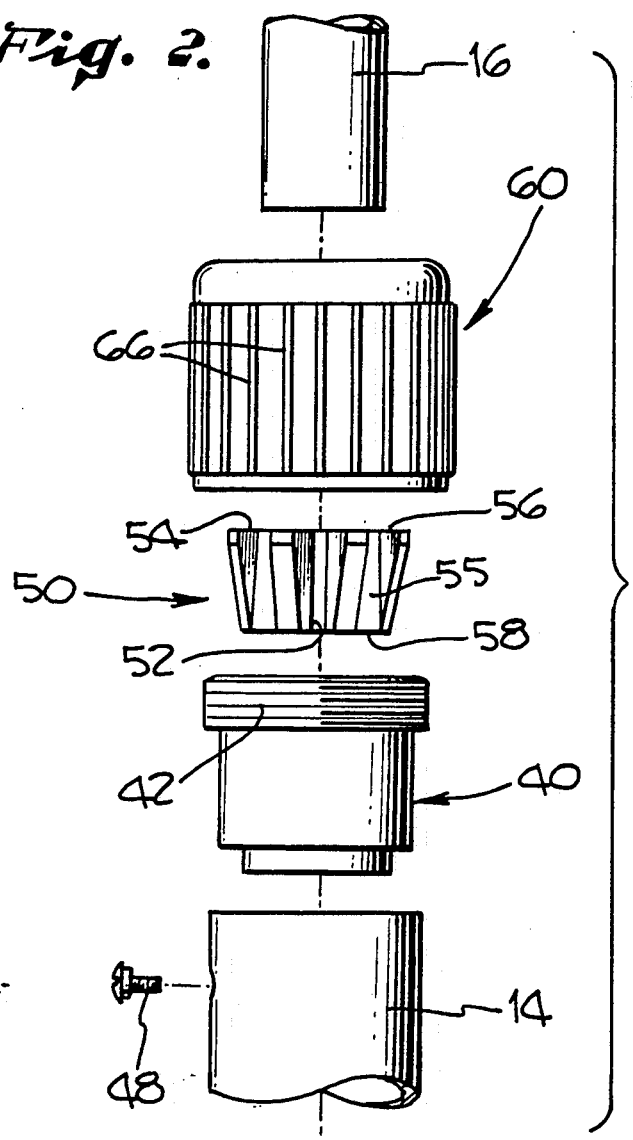
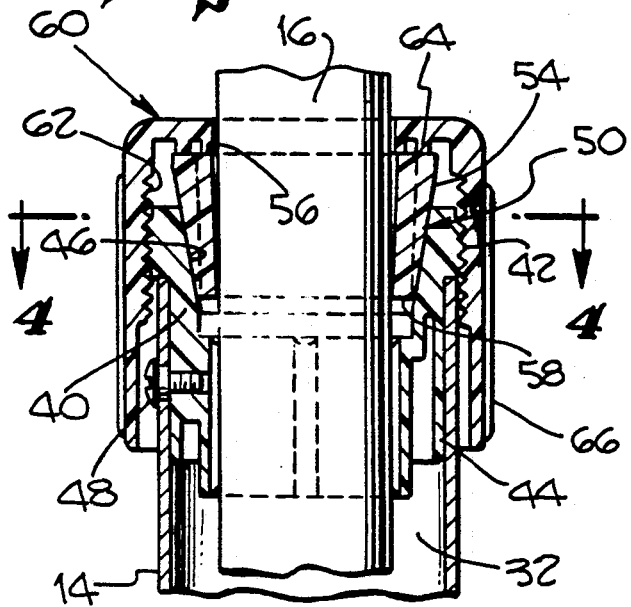
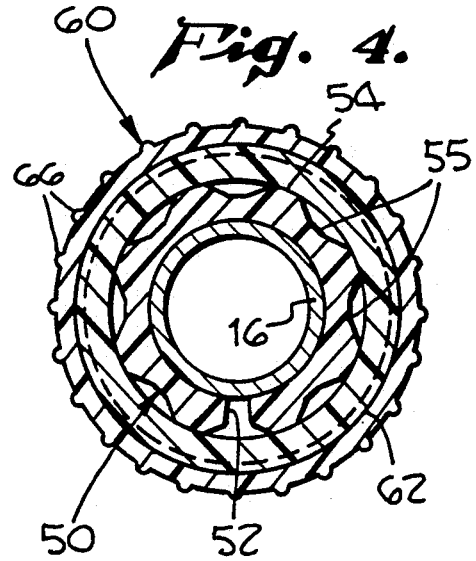

ADJUSTABLE FRAME

PRIOR ART

Prior art includes the following U.S. patents:
U.S. Pat. No. 2,804,278: Jewett shows two longitudinally adjustable pipes with a sleeve clamping an external camming collar.
U.S. Pat. No. 2,961,260: Newlin uses balls to create a radial locking force between inner and outer cylindrical frame members.
U.S. Pat. No. 3,148,854: Junkunc
U.S. Pat. No. 4,856,929: Smahlik et al

BACKGROUND OF THE INVENTION

In many situations it is desirable to have an extendible frame which can be adjusted to a selected position of extension. This is commonly done by utilizing inner and outer tubular members, the inner member being slidably received within the outer member, and providing means to secure the inner member in its selected position.

Many prior art devices have satisfied this requirement in one way or another. There are, however, a number of considerations which are involved if an optimum result is to be obtained. These include the ease of operating the device, the degree of reliability and safety that it provides, the cost of manufacture, and its appearance.

For example, the operation should be such that the frame can be very easily extended, can be easily locked in place, and yet will remain very firmly locked in its extended position. Cost of the manufactured parts should be kept to a minimum. And the device should have a neat appearance.

SUMMARY OF THE INVENTION

According to the present invention an adjustable frame includes an outer tubular member and an inner cylindrical member which are disposed in longitudinally adjustable relation. The inner member is made of substantially smaller diameter than the interior of the outer member so as to provide an annular space between the two members. Inner and outer adapter rings are disposed about the inner cylindrical member within the annular space, the adapter rings having longitudinally tapered mating surfaces for providing a cam action. Tightening means includes a sleeve that is threadedly supported from the outer tubular member and engages one of the adapter rings for moving it axially relative to the other ring, creating a radial expansion force within the annular space between the inner and outer tubular members which provides a very secure locking action.

Thus the object of the invention is to provide an adjustable frame having improved performance and reduced manufacturing cost.

DRAWING SUMMARY

FIG. 1 is an elevation view of an adjustable fan which embodies an adjustable frame in accordance with the presently preferred form of the invention;

FIG. 2 is an exploded view of the component parts of the locking mechanism of FIG. 1;

FIG. 3 is a cross-sectional view taken on the line 3—3 of FIG. 1; and

FIG. 4 is a fragmentary cross-sectional view taken on the line 4—4 of FIG. 3.

DESCRIPTION OF PREFERRED EMBODIMENT

As shown in FIG. 1 an adjustable fan 10 has a base member 12 from which an elongated tubular member 14 rises vertically upward. A cylindrical member 16 of smaller diameter than the member 14 extends upwardly therefrom, being secured in a desired position of vertical adjustment by a locking mechanism 30. FIGS. 2–4 show the details of the locking mechanism. Above the member 16 there is another tubular member 18 which carries a rotating switch 20. A motor 22 mounted on top of the member 18 drives a fan blade 24.

Thus an adjustable stand includes the elongated tubular member 14 and the cylindrical frame member 16 whose lower end is received within the upper end of tubular member 14. An annular space 32 is left between these two members—see FIG. 3. A collet holder 40 is partially received within the upper end of tubular member 14. The collet holder has an externally threaded extension portion 42 which extends longitudinally above the upper end of the tubular member 14. A collet 50 has a circumferential gap 52 therein, as shown in FIG. 4. The collet is circumdisposed about the frame member 16 and partially received within the collet holder 40.

Both the collet 50 and the collet holder 40 have longitudinal surfaces which are longitudinally tapered. Specifically, the collet has a cylindrical interior surface, and its outer surface 54 is longitudinally tapered. Its greatest radial thickness is at its upper end 56 and its smallest radial thickness is at its lower end 58. Collet holder 40 on its lower end and throughout most of its length has an exterior cylindrical surface 44 which fits rather closely within the interior surface of the tubular member 14. Extension portion 42 of the collet holder has an outer diameter which is slightly greater than the outer diameter of tubular member 14, and is threaded. Collet holder 40 has a tapered, interior wall surface 46 which is of largest diameter at the upper end of the collet holder. Thus, the exterior surface of collet 50 and the interior surface of collet holder 40 provide mating cam surfaces.

As best seen in FIG. 4 the tapered exterior surface 54 of collet 50 has a number of longitudinal grooves 55 spaced about its periphery.

A sleeve member 60 is circumdisposed about the tubular member 14, having internal threads 62 which threadedly engage the extension portion 42 of collet holder 40. Sleeve member 60 also has a circumferential ledge 64 inside its inverted cup-shaped upper end which engages the upper end of collet 50 such that rotating the sleeve in one direction by means of its knurled exterior surface 66 drives the collet 50 downward into the collet holder. The resulting cam action thereby creates a radial expansion force within the annular space 32 for locking the frame member 16 in a selected position of longitudinal adjustment relative to the tubular member 14.

Tubular member 14 and frame member 16 are preferably made of metal. The collet holder 40, collet 50, and locking sleeve 60 are preferably made of plastic material.

The method of assembling the locking mechanism is as follows. Collet holder 40 is attached to the upper end of tubular member 14. It is secured in place by means of a screw 58 which passes through a hole in the wall of member 14 and into a threaded opening in the collet holder. Then the collet 50 is inserted into the collet holder 40. The sleeve member 60 is placed on top of the collet and the collet holder and is screwed downward, but only by a short distance in order to avoid any camming action. Then the cylindrical member 16 is inserted in place. It should be noted here that collet 50 has a normal diameter which leaves some working space around the circumference of the frame member 16 when first inserted. After the member 16 has been placed in a selected position of vertical adjustment the sleeve member 60 is tightened. Because of the gap 52 in its circumference, the camming action of the collet 50 and collet holder 40 causes the collet 50 to become radially compressed. It then tightly grips the circumference of frame member 16 and at the same time directs a radially outward force against the collet holder. Thus, a strong expansive force in a radial direction within the annular space 32 between the tubular member 14 and the frame member 16 assures that the frame member 16 is securely locked in place. Loosening the sleeve member, however, will relieve the camming action and thus release the lock.

The invention has been described in detail in order to comply with the patent laws. The scope of the invention, however, is to be measured only by the appended claims.

What I claim is:

1. An adjustable frame comprising:
   an outer tubular member and an inner cylindrical frame member adapted to be disposed in longitudinally adjustable relation with and end of said inner frame member projecting within said outer tubular member, said frame member being of substantially smaller diameter than the interior surface of said outer member so as to provide an annular space therebetween;
   a collet holder extending partially within said tubular member and having throughout most of its length an exterior cylindrical surface which fits rather closely within the interior surface of said tubular member, said collet holder having an externally threaded outer end portion which extends longitudinally beyond the end of said tubular member, said collet holder also having a tapered interior wall surface which is of largest diameter at said outer end, said externally treaded portion of said collet holder being of larger diameter than the external surface of said tubular member;
   a collet circumdisposed about said frame member in a normally loose relation therewith and having an inner end extending partially within said collet holder and said tubular member, said collet having a cylindrical interior surface and its outer surface being longitudinally tapered with its smallest radial wall thickness at said inner end, the exterior surface of said collet and the interior surface of said collet holder thus providing longitudinally tapered mating cam surfaces;
   said collet being made of a resilient material, said collet having a circumferentially gap therein so that it may be radially compressed against the outer surface of said frame member; and
   a sleeve member having a cup-shaped end with an opening therein which is circumdisposed about said frame member, having a circumferential ledge inside said cup-shaped end which engages the outer end of said collet, having internal threads which threadedly engage the external threads of said extended portion of said collet holder, and having a knurled exterior surface adapted for rotating said sleeve member in one direction so as to drive said collet into said collet holder and thereby radially compress said collet against said frame member and create a radial expansion force within said annular space for locking said frame member in a selected position of longitudinal adjustment relative to said tubular member.

2. An adjustable frame as in claim 1 wherein said collet has longitudinal grooves formed in the external surface thereof.

3. An adjustable stand comprising:
   an elongated tubular member adapted to be vertically disposed;
   an elongated frame member of substantially smaller diameter than said tubular member, the lower end of said frame member being received within the upper end of said tubular member and leaving an annular space therebetween;
   a collet holder extending partially within said upper end of said tubular member and having throughout most of its length an exterior cylindrical surface which fits rather closely within the interior surface of said tubular member, said collet holder having a tapered interior wall surface which is of largest diameter at its upper end, said collet holder also having an externally threaded extension portion which extends longitudinally above said upper end of said tubular member, said externally threaded portion of said collet holder being of larger diameter than the external surface of said tubular member;
   a collet circumdisposed about said frame member in a normally loose relation therewith and also extending partially within said collet holder and said tubular member, said collet having a cylindrical interior surface and its outer surface being longitudinally tapered with its greatest radial wall thickness at its upper end, the exterior surface of said collet and the interior surface of said collet holder thus providing longitudinally tapered mating cam surfaces;
   said collet being made of a resilient material, said collet having a circumferentially gap therein so that it may be radially compressed against the outer surface of said frame member; and
   a sleeve member having a cup-shaped upper end with an opening therein which is circumdisposed about said frame member, having a circumferential ledge inside said inverted cup-shaped upper end which engages the upper end of said collet, having internal threads which threadedly engage the external threads of said extension portion of said collet holder, and having a knurled exterior surface adapted for rotating the sleeve in one direction so as to drive said collet downward into said collet holder and thereby radially compress said collet against said frame member and create a radial expansion force within said annular space for locking said frame member in a selected position of longitudinal adjustment relative to said tubular member.

4. An adjustable stand as claimed in claim 3 wherein said collet has longitudinal grooves formed in the external surface thereof.

* * * * *